Figure 1:
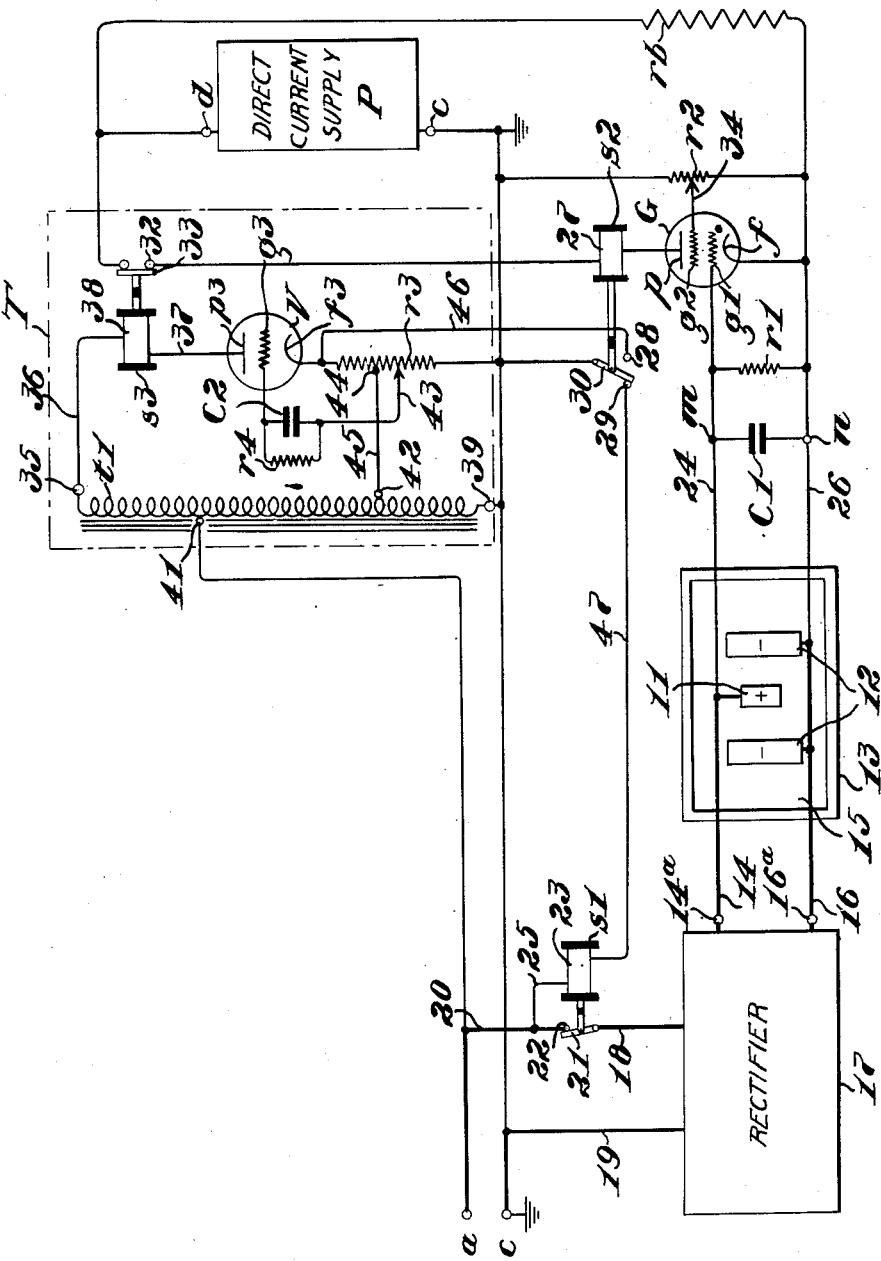

Aug. 21, 1951     E. H. WALLACE     2,564,823
ELECTROPOLISH INTERRUPTER
Filed Feb. 27, 1948     2 Sheets-Sheet 1

Inventor
Edward H. Wallace
by Roberts, Cushman & Grover
Atty's

Patented Aug. 21, 1951

2,564,823

UNITED STATES PATENT OFFICE 2,564,823

ELECTROPOLISH INTERRUPTER

Edward H. Wallace, Sherrill, N. Y., assignor to Oneida, Ltd., Oneida, N. Y., a corporation of New York Application February 27, 1948, Serial No. 11,703

4 Claims. (Cl. 204—228)

This invention relates to the control of an electrolytic cell and more particularly to a cell as used for electropolishing operations—as in the polishing or polishing and plating of silverware.

It is known to the art that a high luster is developed by the surface of a metal object, which has been immersed in an aqueous electrolytic bath of an alkali metal cyanide as the anode, and subjected for a sufficient length of time to an electrical potential which is maintained between the point at which the metal surface manifest a polishing effect and that at which a spontaneous flashing phenomena occurs (U. S. Patent 2,416,294) February 25, 1947.

However, practical difficulties are encountered, especially in a large installation with a high current flow through the cell, when an attempt is made to maintain the potential of a low voltage high current supply within such narrow confines of the polishing voltage range. Recently it has been proposed to obtain a polishing action by intermittently applying power to the metal electrodes for a few seconds. After the power is interrupted, it is then sent through the cell again and this intermittent operation repeated for several cycles until the desired luster is attained.

Objects of this invention are to provide an electric circuit which reduces the voltage of the power-supply of an electrolytic cell when such voltage has risen to a predetermined value optimum for the conditions of cell operation and which thereupon is effective to increase the voltage of the cell power supply, after a time period which is sufficient to depolarize the cell substantially.

Another object is to provide an electric circuit which reverses the polarity of the cell power source when the voltage has risen to a predetermined value optimum for the conditions of cell operation and which thereupon is effective to restore the original polarity after a predetermined time delay.

It is also an object that the circuits should operate automatically and with a minimum of attention, require very little maintenance, and be simple to install and economical to construct. Other objects will appear from the following disclosure.

In a broad aspect the invention contemplates an electrical circuit for controlling the power source for supplying to the electrodes of an electrolytic cell, a potential varying with the load placed upon the source by the cell. In different aspects the switch is used to vary the potential, change the polarity or disconnect the potential supplied to the electrodes. The increase in resistance between the electrodes accompanying the electrolytic action reduces the current supplied by the power source thereby effectuating a change in the potential of such source. When the power source potential reaches a value predetermined as optimum for the conditions of cell operation, a voltage sensitive device such as a tube or relay is actuated thereby to complete a control circuit through the circuit making elements of the device, to operate the switch element in the cell power source circuit. After the lapse of a time interval sufficient to depolarize the cell substantially, a timing device interrupts the control circuit so that the switching element returns to its normal position and either restores the original potential supplied to the electrodes by the power source or reverse the polarity thereof.

In a more specific aspect the invention contemplates controlling such a power source for the electrodes of the electropolishing cell by the use of a relay having normally closed contacts operated by a solenoid to disconnect the electrodes of the cell from the source. The solenoid is connected in series with the plate circuit of a vacuum tube. The cathode and grid of the tube are connected respectively to the cell cathode and anode so that the electrode potential difference therebetween is impressed upon the grid of the tube. When, as described above, the internal resistance of the cell increases and the potential of the power source reaches a predetermined value corresponding to the tube firing potential, the tube conducts. The resulting current flow in the plate circuit energizes the solenoid thereby to close the contacts and disconnect the cell from the power source. Also connected in the plate circuit of the vacuum tube is a normally closed switch operated by a timing device. After the lapse of a time interval sufficient to depolarize the cell substantially, the switch is opened by the timing device, the relay solenoid is de-energized and its contacts return to the normally closed position to restore the original potential to the electrodes.

In another specific aspect of the invention in which both polishing and plating of the surface is to be effected, a double pole, double throw relay is connected between the electrodes of the cell and a direct potential power source, the potential of which varies with the load imposed by the cell. The relay contacts are connected so that the polarity of potential supplied to the cell electrodes from the power source is reversed when the relay is energized. The relay solenoid is connected in series with the plate circuit of a vacuum tube.

The cathode and grid of the tube are connected respectively to the cell cathode and anode to impress the electrode potential difference upon the grid of the tube. When as a result of increased internal cell resistance the potential of the power source reaches a predetermined tube firing potential, the tube conducts. The resulting current flow in the plate circuit energizes the solenoid to move the contacts and reverse the polarity of the potential supplied to the cell electrodes, whereby a plating action takes place in the cell. Also connected in the plate circuit of the vacuum tube is a normally closed switch operated by a timing device. After the lapse of a time interval sufficient to depolarize the cell and to effect a predetermined amount of plating upon the surface of the work in the cell the switch is opened by the timing device. The relay solenoid is de-energized and its contacts return to restore the original polishing potential polarity to the electrodes.

Figure 2:
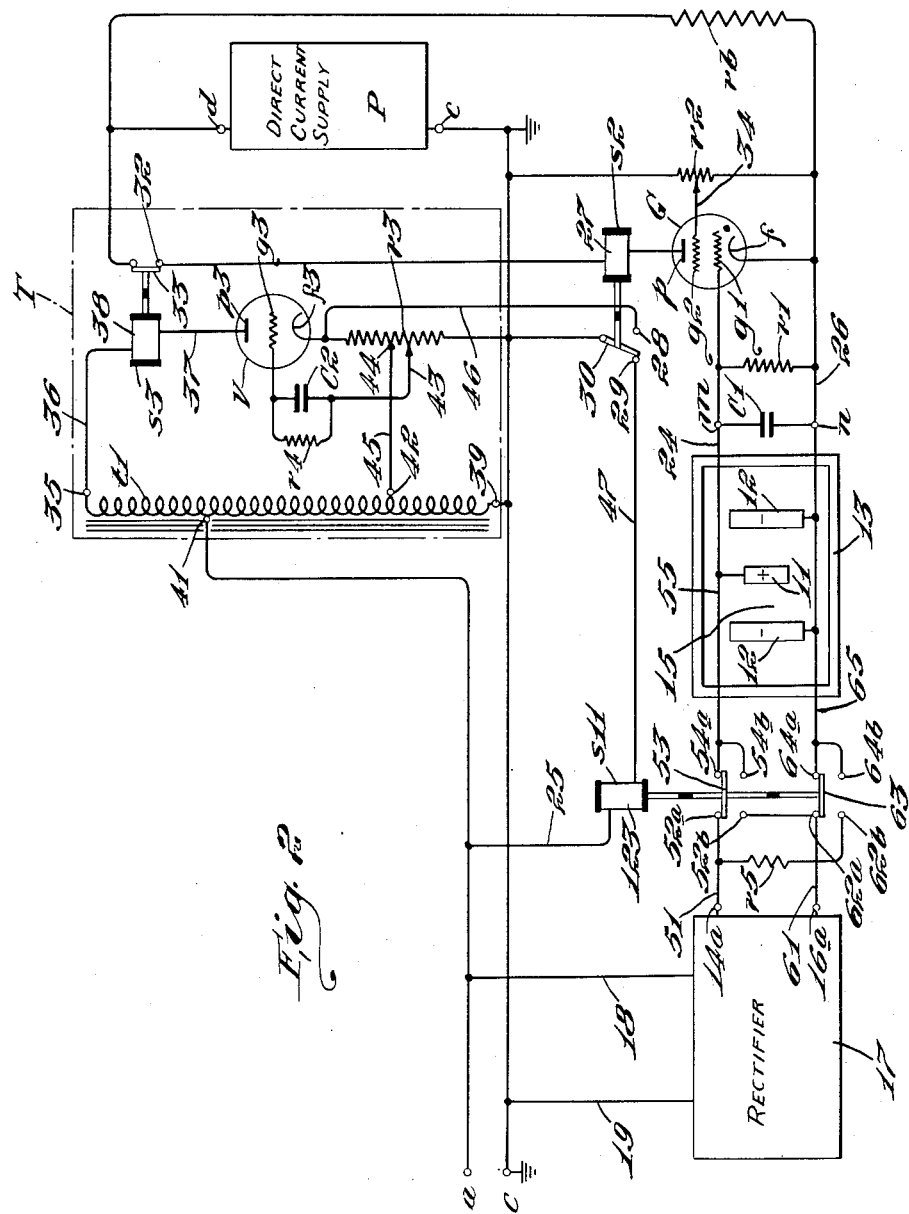

For the purpose of illustration, a typical embodiment of the invention is shown in the accompanying drawing in which:

Fig. 1 is the circuit diagram of one embodiment of the invention whereby the cell electrodes are disconnected from the potential source; and Fig. 2 is a circuit diagram of another embodiment of the invention whereby the polarity of the potential source connected to the cell electrodes is reversed.

In the particular embodiment of the invention chosen for the purpose of illustration, the two cathodes 12 and a metal article, such as a silver plated spoon with 8 square inches of silver plated surface to be polished, are immersed in an electrolytic cell 13 containing an aqueous electrolytic bath 15 of an alkaline metal cyanide, for example, a 3 liter bath comprising 0.3 molar silver, 0.3 molar potassium carbonate and 0.3 molar free potassium cyanide.

The plated article serves as an anode 11 of the cell 13 and is connected by a cable 14 to a positive terminal 14a of the output circuit of a power rectifier 17 with an output rating of 50 amperes at 7 volts D. C. A silver cathode 12 with an area of 14 square inches is placed on each side of the anode 11 with a distance of 4 inches therebetween. The cathodes 12 are connected with a negative terminal 16a of the rectifier output circuit by a cable 16. The anode 11 is agitated between the cathode 12 by any conventional means at the rate of 1.4 ft./min.

The input circuit of the rectifier 17 is connected by a lead 19 to a grounded terminal $c$ of an alternating power source (not shown). The input circuit is completed to a terminal $a$ of the power supply through a wire 18, the normally open contacts 21 and 22 of a relay $s1$ and a wire 20.

Also connected with the anode and cathodes 11 and 12 is a voltage sensitive device, such as a gas filled vacuum tube G which may be of the 2050 type. The anode 11 of the cell 13 is connected by means of a wire 24 to a terminal $m$ which is linked to a grid $g1$ of the tube G. A tube cathode $f$ with a terminal $n$ is connected to the cathode 12 by a wire 26. A capacitor C1 and a resistor $r1$ are connected in parallel across the terminals $m$ and $n$. The capacitor C1 prevents the premature firing of the tube G the instant current is supplied to the cell electrodes, and also tends to filter out any "hash" or 60 cycle ripple which may be present. The resistor $r1$ provides a return circuit for the grid $g1$. A plate $p$ of the tube G, which together with the cathode $f$ comprise the circuit making elements of the tube G, is connected to a positive terminal $d$ of a conventional direct current power supply P through a coil 27 of a relay $s2$, and the contacts 32 and 33 of a switch $s3$ controlled by a timing device T, for example a conventional vacuum tube time delay relay.

The terminal $c$ of the direct current power supply P is grounded. The potential to ground of a grid $g2$ of the tube G and therefore the firing potential of the tube is controlled by the position of an adjustable tap 34 of a resistor $r2$ which is connected between the grounded terminal $c$ and the tube cathode $f$. A bleeder resistor $rb$ is connected between the terminal $d$ and the tube cathode $f$.

The timing device T for operating the contacts 32 and 33 of the switch $s3$ comprises a vacuum tube V such as the type 6C5 with a plate $p3$ connected by the wires 36 and 37 with a coil 38 of the relay $s3$ and a terminal 35 at one end of a winding of an autotransformer $t1$. The terminal 39 at the opposite end of the autotransformer winding is linked with the ground terminal $c$. The power supply circuit to the winding of the autotransformer $t1$ is completed by connecting the terminal $a$ with an intermediate tap 41. The tube cathode $f3$ of the tube V is connected to the grounded terminal $c$ through a tapped resistor $r3$. One terminal 44 of the resistor $r3$ is linked with an intermediate tap 42 of the autotransformer $t1$ by a lead 45.

A timing capacitor C2 is connected between a second adjustable tap 43 of the resistor $r3$ and a control grid $g3$ of the tube V. A resistor $r4$ is connected in parallel with the capacitor C2 to act as a bleeder for any accumulated charge. The tube cathode $f3$ is also connected by a wire 46 with a stationary contact 28 of the relay $s2$. A moving relay contact 30 is grounded to the terminal $c$ so that the energizing of the relay $s2$ places the tube cathode $f3$ at ground potential. A second terminal 29 of the relay $s2$ is connected by the wire 47 to one end of a coil 23 of the relay $s1$. The other end of the coil 23 is connected to terminal $a$ through the wires 25 and 20.

In Fig. 2 is shown another embodiment of the invention wherein the power supplied to the anode 11 and the cathodes 12 from the rectifier 17 is reversed in polarity by the energization of a reversing relay $s11$. The relay $s11$ comprises an actuating coil 123 and two movable contacts 53 and 63. When the coil 123 is energized, the movable contact 53 bridges a pair of stationary contacts 52a and 54a; and the movable contact 63 bridges a pair of stationary contacts 62a and 64a. In the de-energized relay position a pair of stationary contacts 52b and 54b and a pair of stationary contacts 62b and 64b are connected by the movable contacts 53 and 63 respectively.

A resistor $r5$ links the contacts 52a and 62b. The stationary contacts 52b, 54b and 64a are connected to the stationary contacts 62a, 54a and 64b respectively. The terminals 14a and 16a of the output circuit of the rectifier 17 are joined to the stationary contacts 52a and 62a by the cables 51 and 61 respectively. The terminals 54a and 64a are connected to the anode 11 and the cathodes 12 by the cables 55 and 65 respectively. The remainder of the circuit is similar to the circuit shown in Fig. 1 and described in detail heretofore.

The silverware to be polished is suspended in the electrolyte 15 and the alternating current power source is connected across the terminals $a$ and $c$. The coil 23 of the relay $s1$ is energized from the power source by a circuit through the wires 20, 25 and 47 and the contacts 29 and 30 of the relay s2. Energization of coil 23 closes the contacts 21 and 22 to energize the rectifier 17 having a rated output capacity of 50 amperes at 7 volts D. C. and supply a potential across the anode 11 and the cathodes 12 of the cell 13. The resulting current flow causes a complex electrolytic action which dissolves the high spots upon the anode surface. As the electrolytic action takes place, the internal resistance of the cell increases so that after approximately for example 4 seconds the voltage difference between the anode 11 and the cathodes 12 has increased to for example 2.8 volts.

The adjustable tap 34 of the resistor r2 is adjusted so that the potential on the grid g2 is such that when a voltage of for example 2.8 volts appears between the grid g1 and the filament f, the tube G will conduct. After the voltage difference between the anode 11 and the cathodes 12 reaches this predetermined potential as described above, the resulting current flow from the direct current supply P through the coil 27 of the relay s2 opens the contacts 29 and 30 to de-energize the coil 23 of the relay s1. The contacts 21 and 22 open to de-energize the rectifier 17 stopping the polishing action.

The connection of an alternating power source across the terminals a and c energizes the winding of the autotransformer t1. The resulting voltage difference between the tap 42 and the grounded terminal 39 of the autotransformer t1 circulates an alternating current through a path including the wire 45 and the portion of the resistor r3 between the tap 44 and the terminal grounded c. During the portion of each cycle when the plate p3 is negative with respect to the tap 44, the tap 43 and therefore the grid g3 are positive with respect to the tap 44 and the filament f3 by the amount equal to the voltage difference in the resistor r3 between the taps 43 and 44. With the contacts 28 and 30 open a current flows through a circuit including the tube cathode f3, the grid g3, the capacitor C2, the tap 43 and the resistor r3 to build up a charge on the capacitor C2 so that the grid g3 is at a negative average potential. As the relative characteristics of the resistor r4 and the capacitor C2 are such that the latter does not discharge appreciably during the portion of the cycle when the polarity is reversed, the grid g3 is maintained at substantially the same negative potential and tube V does not conduct.

When, however, the contacts 28 and 30 are closed by the energization of the coil 27, the cathode f3 is connected to ground through the lead 46 so that the tap 43 is positive with respect to the tube cathode f3 by the amount of the voltage difference in the portion of the resistor r3 between the adjustable tap 43 and ground during the portion of the cycle when the plate p3 is positive with respect to the cathode f3. The capacitor C2, however, retains a negative charge which opposes the positive voltage between the tap 43 and ground and prevents the conduction of the tube V. After a time delay determined by the characteristics of the capacitor C2 and the resistor r4, the negative charge upon the capacitor C2 discharges through the resistor r4 until the negative voltage upon the grid g3 has decreased sufficiently so that a current of sufficient magnitude to energize the coil 38 of the relay s3 flows through the tube V thereby opening the contacts 32 and 33.

The size of the capacitor C2 and the resistor r4 are chosen so that the tap 43 can be adjusted to obtain a delay of for example approximately 4 seconds before the tube V conducts. When the resulting flow of current through the plate circuit of the tube V energizes the coil 38 of the relay s3, the opening of the normally closed contacts 32 and 33 interrupts the direct current supply P to the relay coil 27. The de-energization of the coil 27 closes the contacts 29 and 30 to energize the rectifier 17 and opens the contacts 28 and 30 so that the grid g3 cuts off the current flowing through the tube V and the relay s3 to reclose the contacts 32 and 33, thus resetting the timing device T. The 4-second power "on and off" cycles are repeated as described above for a total elapsed "on" period of approximately 1 minute which in the present example produced a satisfactory luster.

In the embodiment shown in Fig. 2, the polarity of the power source is reversed so that silver from the electrolyte 15 in the cell 13 is plated upon the surface of the anode 11 after the film is reduced. The connecting of an alternating power source to the terminals a and c energizes the coil 123 of the relay s11, the rectifier 17 and the autotransformer t1. The moving contacts 53 and 63 connect the anode 11 and the cathodes 12 of a cell 13 to the rectifier output terminals 14a and 16a respectively. A film is formed and after in the present example approximately 4 seconds of operation the predetermined potential difference of 2.8 volts appears across the anode 11 and the cathodes 12. The tube G conducts so that the relay s2 is energized and the relay s11 is de-energized in a manner similar to that described heretofore. The contacts 53 and 63 move to reverse the polarity of the power supplied to the electrodes of the cell 13. The rectifier terminal 14a is connected to the cathodes 12 by means of the cable 51, the resistor r5, the contact 62b, the moving contact 63, the contact 64b, and the cable 65. The rectifier terminal 16a is connected to the anode 11 by the cable 61, the contact 52b, the moving contact 53, the contact 54b, and the cable 55.

The voltage difference through the resistor r5 reduces the rectifier voltage applied across the anode 11 and cathodes 12 to that suitable for silver plating, for example, 2 volts. The tap 43 of the resistor r3 of the timing device T is adjusted to de-energize the relay s11 and limit the plating time to for example 15 seconds. The polarity of the power source is then again reversed to effect the polishing action. This cycle is repeated for approximately 30 minutes of total plating time to effect a satisfactory thickness of plate.

It should be understood that the present disclosure is for the purpose of illustration only and that this invention includes all modifications and equivalents which fall within the scope of the appended claims.

I claim:

1. An electric circuit for controlling a direct power source supplying to the electrodes of an electrolytic cell, a potential varying with the load, said circuit comprising a coil actuated reversing relay for connecting the power source to the cell electrodes, a vacuum tube having a plate, a cathode and a grid, said cathode and grid being connected respectively to the cathode and anode of said cell so that the voltage difference between the anode and cathode of the cell is impressed upon the grid, said plate being connected in series with the actuating coil of the reversing relay to energize the reversing relay when the potential difference between the anode and cathode of the cell reaches a value which will cause the tube to conduct, and a timing device having a switch interposed in the circuit of the plate and the coil to deenergize the reversing relay and reconnect the anode and cathode of the cell with the original polarity after the elapse of a time interval from energization of the solenoid sufficient substantially to depolarize the cell.

2. An electric circuit for controlling a power source for supplying to the electrodes of an electrolytic cell a potential varying with the load, said circuit comprising a coil actuated reversing relay for connecting the power source to the cell electrodes, a voltage sensitive device having a circuit making element rendered conducting in response to a voltage change connected across the electrodes so that the voltage difference due to polarization is impressed upon the device, the circuit making element of said device being connected in series with the actuating coil of the reversing relay to operate the reversing relay when the electrode voltage difference reaches a preselected value, and a timing device having a switch interposed in the series circuit of the circuit making element and the coil to operate the reversing relay to restore the original polarity after the elapse of a time interval from the impressing of the selected polarity sufficient substantially to depolarize the cell.

3. An electric circuit for controlling a direct power source supplying to the electrodes of an electrolytic cell, a potential varying with the load, said circuit comprising a coil actuated reversing relay movable between two positions for connecting the power source to the cell electrodes with either polarity, a resistor connected in series with the cell electrodes in one position of the relay, a vacuum tube having a plate, a cathode and a grid, said cathode and grid being connected respectively to the cathode and anode of said cell so that the voltage difference between the anode and cathode of the cell is impressed upon the grid, said plate being connected in series with the actuating coil of the reversing relay to operate the reversing relay thereby to apply a lower voltage of opposite polarity to the anode and cathode of the cell when the potential difference therebetween reaches a value which will cause the tube to conduct, and a timing device having a switch interposed in the circuit of the plate and the coil to deenergize the reversing relay and reconnect the anode and cathode of the cell with the original polarity after the elapse of a time interval from energization of the solenoid sufficient substantially to depolarize the cell.

4. An electric circuit for controlling a power source for supplying to the electrodes of an electrolytic cell a potential varying with the load, said circuit comprising a coil actuated reversing relay movable between two positions for connecting the power source to the cell electrodes with either polarity, a voltage reducing element connected in series with the cell electrodes in one position of the relay, a voltage sensitive device having a circuit making element rendered conducting in response to a voltage change connected across the electrodes so that the voltage difference due to polarization is impressed upon the device, the circuit making element of said device being connected in series with the actuating coil of the reversing relay to operate the reversing relay thereby to apply a lower voltage of opposite polarity to the cell electrodes when the electrode potential difference reaches a preselected value, and a timing device having a switch interposed in the series circuit of the circuit making element and the coil to operate the reversing relay to restore the original polarity after the elapse of a time interval from the impressing of the selected polarity sufficient substantially to depolarize the cell.

EDWARD H. WALLACE.

REFERENCES CITED

The following references are of record in the file of this patent:

UNITED STATES PATENTS

| Number | Name | Date |
| --- | --- | --- |
| 1,428,049 | Nickum | Sept. 5, 1922 |
| 1,534,709 | Holt | Apr. 21, 1925 |
| 2,470,741 | Gordon | May 17, 1949 |

FOREIGN PATENTS

| Number | Country | Date |
| --- | --- | --- |
| 603,910 | Germany | Oct. 11, 1934 |